United States Patent

Walles

[15] 3,689,810
[45] Sept. 5, 1972

[54] ALL-PLASTIC ELECTRIC CAPACITOR
[72] Inventor: Wilhelm E. Walles, 3606 Chestnut Hill, Midland, Mich. 48640
[22] Filed: April 23, 1971
[21] Appl. No.: 136,800

[52] U.S. Cl. .................317/258, 117/118, 252/500, 317/260
[51] Int. Cl. ...........................................H01g 1/01
[58] Field of Search .............252/500; 317/258, 260; 117/118

[56] References Cited

UNITED STATES PATENTS

| | | | |
|---|---|---|---|
| 2,165,738 | 7/1939 | Van Hoffen | 317/258 X |
| 2,832,699 | 4/1958 | Walles | 117/118 X |
| 3,098,955 | 7/1963 | Davis | 317/258 X |
| 3,185,907 | 5/1965 | McKee | 317/258 |

*Primary Examiner*—E. A. Goldberg
*Attorney*—Griswold & Burdick, R. G. Waterman, L. J. Dankert and M. S. Jenkins

[57] ABSTRACT

An all-plastic electric capacitor having electroconductive organic plastic as electrodes, e.g., polystyrene film having neutralized sulfonic acid groups on the surface thereof, and non-conductive organic plastic as dielectric material, e.g., a vinyl chloride/vinylidene chloride copolymer film. Such plastic capacitors are particularly useful in low frequency applications requiring transparent or translucent capacitors.

7 Claims, 3 Drawing Figures

PATENTED SEP 5 1972   3,689,810

INVENTOR.
Wilhelm E. Walles
BY
Griswold & Burdick
ATTORNEYS

ALL-PLASTIC ELECTRIC CAPACITOR

BACKGROUND OF THE INVENTION

This invention relates to electrical capacitors and, more particularly, it refers to all-plastic capacitors useful in low frequency applications.

It is well known, as taught by U.S. Pat. Nos. 2,735,970, 2,935,651, 2,935,668, 3,397,085, 3,431,473, and 3,457,478, to make electrical capacitors having metal foil electrodes separated by a dielectric material of a non-conductive organic plastic.

In many electrical applications, however, particularly applications requiring relatively low frequencies of from about 0 to about 1,000 cycles/second, it is desirable to have slower rates of charging and discharging than are obtained by conventional metal-containing capacitors. Heretofore, except for combination of a separate electrical resistor in series with capacitor, satisfactory means for accomplishing such slower rates of charging and discharging have not been known.

SUMMARY OF THE INVENTION

In accordance with the present invention, all-plastic electrical capacitors having slow charge and discharge rates are provided. Broadly defined, this all-plastic electrical capacitor comprises electrodes of an electroconductive organic plastic which are electrically separated by a dielectric material of a non-conductive organic plastic. More particularly, the electrodes of said capacitor comprise an organic polymer backbone chain having pendant ionic groups of a type and in number sufficient to conduct electrical current. In addition to being nonconductive, the organic plastic serving as the dielectric material is normally solid and is capable of withstanding conditions of temperature and the like which are common to conventional metal-plastic laminate capacitors.

The all-plastic capacitors of this invention are additionally advantageous in that they are transparent or translucent as the situation requires. A particularly desirable characteristic of the all-plastic capacitors of this invention is that they are self-healing, i.e., can recover from a voltage overload to continue to function as a capacitor when voltage returns to acceptable levels. Such capacitors are particularly useful in low frequency applications such as miniaturized and microminiaturized electric circuits wherein there is a need for very small transparent or translucent elements such as capacitors, resistors and other elements of amplification, rectification and attenuation.

DESCRIPTION OF THE PREFERRED EMBODIMENTS

Figure 1:
FIG. 1 is a cross-sectional view of an all-plastic laminate capacitor.
Figure 2:
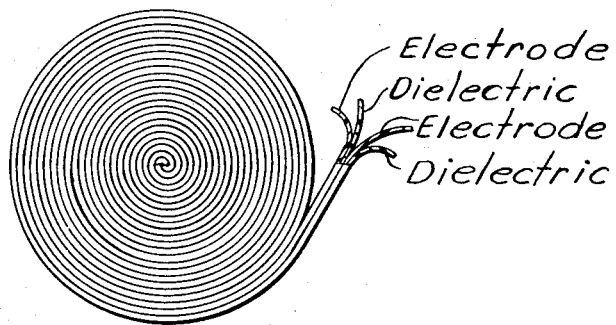
FIG. 2 is a side view of a wound all-plastic capacitor with cross-sectional view of a portion of the capacitor.

In the more advantageous embodiments of the present invention, the all-plastic capacitor is a thin film capacitor comprising a first electrode of a layer of the electroconductive organic plastic, a layer of dielectric material of non-conductive organic plastic contacting a surface of the first electrode and a second electrode of an electroconductive organic plastic contacting the exposed surface of said dielectric layer and electrically insulated from the first electrode by the dielectric layer. It is understood that the thin film capacitor can be a laminate of the electroconductive and non-conductive organic plastic as shown in FIG. 1. It can also be a sheet or film of a single non-conductive organic plastic in which polymer molecules at two opposed surfaces of the sheet or film have been rendered electroconductive as described hereinafter. The capacitors of this invention can suitably exist in wound or rolled form as shown in FIG. 2, produced by convolutely winding two sheets or strips of electroconductive organic plastic with the corresponding strips or sheets of dielectric material inserted therebetween and preferably by winding two strips or sheets of organic plastic having an electroconductive side and a non-conductive side such that the electroconductive sides are electrically insulated from themselves and each other by the non-conductive sides. Similarly, the capacitors of this invention can suitably exist as an assemblage or a laminate of a plurality of alternating layers of an electroconductive organic plastic and nonconductive organic plastic whereby the layers of electroconductive plastic are electrically insulated from one another by the non-conductive plastic layers. By the term "assemblage" is meant a stack or similar such configuration of alternating layers of electroconductive and non-conductive plastics of which only some are bonded together or none are bonded together. It is further understood that the capacitors of this invention can exist as articles having shapes very different from sheets or films, for example, cylindrical rods, helical members, beads, woven textiles and the like. Any all-plastic capacitor having at least two electrodes of an electroconductive plastic material which are insulated from one another by a non-conductive plastic material, i.e., the dielectric material, is contemplated to be a part of the present invention.

By the term "electroconductive organic plastic" is meant any normally solid generally hydrophobic polymer having macromolecules of a generally organic backbone chain having pendant ionic groups such as the neutralized forms of sulfonic acid, sulfinic acid, phosphonic acid, phosphinic acid, and carboxylic acid, preferably sulfonic acid, such that said polymer has an electrical resistivity of less than $10^9$ ohm per square, preferably less than $10^6$ ohm per square. Any organic polymer to which such ionic groups can be attached are suitable for the purposes of this invention. Electroconductive polymers are generally provided by one of the following ways: (1) by polymerization of monomeric material which includes ionic monomer or monomers readily converted to ionic monomers and (2) by treatment of generally non-conductive, normally solid organic polymers with reagent capable of attaching ionic groups to the normally non-conductive polymer molecule.

Ionic monomers or monomers which are readily converted thereto include the polymerizable ethylenically unsaturated carboxylic and sulfonic acids and derivatives thereof such as styrene sulfonic acid and metal salts thereof, acrylic acid, methacrylic acid and metal salts thereof, and ethylenically unsaturated amines or quaternary ammonium salts such as vinylbenzyl trimethyl ammonium chloride and vinylbenzyl dimethylamine. It is further understood that copolymers of such ionic monomers with non-ionic monomers as listed hereinafter in discussion of non-conductive polymers are also suitable. Methods for polymerizing such ionic monomers are well known to those skilled in the art. For example, see the method described in U.S. Pat. No. 3,379,702.

Non-conductive polymers which can be suitably employed are of the following two general classes: the polyethylenic addition type having backbone chains consisting essentially of ethylenic linkages and the condensation type having backbone chains having ester, ether, amide, imine, carbamate, carbonate linkages or a combination thereof. Addition polymers which consist essentially of a saturated polyethylenic molecular chain to which are attached various aromatic and non-aromatic substituent groups include, for example, various homopolymers and copolymers of any one or more of the following monomers: polymerizable $\alpha$-olefins, such as ethylene, propylene, isobutylene, butene-1, methyl-1-pentene, 1-hexene, norbonadiene, allene, and others having 15 carbon atoms or less; polymerizable monovinylidene carbocyclic aromatic compounds such as styrene, $\alpha$-methyl styrene, ar-t-butyl styrene, archlorostyrene, ar-bromo-styrene, ar,ar-dibromostyrene, ar,ar-dichlorostyrene, $\alpha$,ar-di-methylstyrene, vinyl naphthalene, ar-methylstyrene, and others having 15 carbon atoms or less and including those having aromatic ring substituted groups such as halogen, acetyl, and alkyl; polyethylenically unsaturated carbocyclic aromatic compounds such as divinyl benzene, trivinyl benzene, divinyl naphthalene and the like; halo-substituted $\alpha$-olefins such as vinyl chloride, vinyl-bromide, vinylidene chloride, vinylidene bromide, and others having 10 carbon atoms or less; alkyl and hydroxy alkyl esters of $\alpha$, $\beta$-ethylenically unsaturated mono- and di-carboxylic acids such as ethyl acrylate, methyl methacrylate, n-butyl acrylate, iso-butyl acrylate, amyl acrylate, ethyl methacrylate, diethyl itaconate, methyl hydrogen maleate, diethyl maleate, 2-hydroxyethyl acrylate, and other esters having alkyl or hydroxyalkyl moieties of one to 10 carbon atoms and carboxylic acid moieties of three to eight carbon atoms; $\alpha,\beta$-ethylenically unsaturated nitriles such as acrylonitrile, methacrylonitrile, ethacrylonitrile, and the like; $\alpha$, $\beta$-ethylenically unsaturated amides such as acrylamide methacrylamide, ethacrylamide; $\alpha,\beta$-mono- and di-ethylenically unsaturated ethers such as methyl vinyl ether, divinyl ether, ethyl vinyl ether, and others having 15 carbon atoms or less; $\alpha,\beta$-mono- and di-ethylenically unsaturated ketones such as methyl vinyl ketone, divinyl ketone, and others having 15 carbon atoms or less; ethylenically unsaturated esters of saturated or non-polymerizable carboxylic acids, such as vinyl acetate, vinyl propionate, vinyl butyrate, vinyl benzoate, and others having 12 carbon atoms or less; vinyl isocyanate, vinyl carbonate, and other polymerizable ethylenically unsaturated monomers.

Of the foregoing addition polymers and copolymers, polyethylene, poly(methyl-1-pentene), poly(isobutylene), polypropylene, polystyrene, styrene/divinyl benzene copolymer, chlorinated polyethylene, chlorinated polypropylene, polyacrylonitrile, poly(methyl methacrylate), poly(vinyl chloride), poly(vinyl acetate), poly(ethyl acrylate), poly(ethyl methacrylate), vinyl chloride/vinyl acetate copolymers, vinyl chloride/vinylidene chloride copolymers, styrene/acrylonitrile copolymers, acrylonitrile/butadiene/styrene copolymers are preferred.

Condensation type resins suitable for the preparation of electroconductive polymers include thermoplastic types such as the polyamides, e.g., nylon; polyimides; the polyesters, e.g., poly(ethylene terephthalate), and poly(ethylene 1,5-naphthalate); polycarbonates; and polyethers, e.g., polyformaldehyde. Also included are the thermoset resins such as the epoxy resins; phenol-formaldehyde resins; melamine-formaldehyde resins; polyurethanes; urea-formaldehyde resins, various silicone resins, polysulfones, ladder polymers of diisocyanates.

The foregoing addition and condensation polymers can be made electroconductive by substituting an ionic group for hydrogen on the desired monomer and then polymerizing the resulting ionic monomer. For example, alkali metal and alkaline earth metal salts of styrenesulfonic acid such as sodium styrene sulfonate potassium styrenesulfonate and calcium styrenesulfonate, can be polymerized to corresponding styrene sulfonate polymer. Preferably the foregoing hydrophobic non-conductive addition and condensation polymers are rendered electroconductive by surface treating shaped articles of such polymers such as sheets, films, strips, fibers, filaments and the like. For example, a single surface or two opposing surfaces of such shaped articles are subjected to such treatments as sulfonation, carboxylation, phosphonation, nitration, oxidation and the like. Although not required to render such polymers electroconductive, it is generally desirable to neutralize the resulting acid groups with base such as ammonia or ammonium hydroxide, alkali metal hydroxide, alkaline earth metal hydroxide, and other bases which are at least as basic as ammonia.

In the practice of this invention sulfonation, especially sulfonation followed by neutralization, is a preferred technique for rendering non-conductive polymers electroconductive and is therefore described in detail hereinafter. It is understood, however, that known techniques for carboxylation of polymers, for phosphonation of polymers, for nitration of polymers and for oxidation of polymers can be suitably employed in the practice of this invention.

More specifically, surface sulfonation of the shaped article of non-conductive addition or condensation polymer is satisfactorily accomplished by subjecting the surface of the shaped article to be sulfonated to the action of a sulfonating reagent such as concentrated sulfuric acid containing at least about 98 weight percent of $H_2SO_4$, oleum, anhydrous solutions of oleum and free sulfur trioxide, from trace amounts up to about 10 weight percent of dilute sulfur trioxide in an inert chlorinated solvent, or gaseous sulfur trioxide diluted with inert gas such as air, nitrogen, carbon dioxide and the like. Techniques employing these sulfonation reagents are more fully described in the prior art, e.g., U.S. Pat. Nos. 2,937,066, 2,945,842, and 2,854,477. While surface sulfonation of the polymer is suitably accomplished with any of the aforementioned sulfonating agents, it is generally more advantageous to employ a vapor phase containing from about 1 to about 100 volume percent gaseous sulfur trioxide, preferably from about 2 to about 10 percent, in an inert gas such as air, nitrogen, carbon dioxide, or helium. Sulfonation using the vapor phase reagent is preferred since visible attack of the plastic surface is more severe in the methods wherein inert solvents are used.

The shaped article of non-conductive polymers is contacted with the sulfonating agents for a period of time that varies inversely with the temperature and concentration in order to achieve the degree of sulfonation which provides from about 0.0001 to about 30 milligrams, preferably from about 0.001 to 1 milligram of sulfur trioxide equivalents ($SO_3$) in the form of sulfonic acid groups per square centimeter of surface. For example, if one uses an 8 volume percent concentration of sulfur trioxide in an inert gas such as carbon dioxide at 25°C to sulfonate the plastic article to the extent of 0.05 milligram of $SO_3$ in the form of sulfonic acid groups per square centimeter of surface, one can use a contact time of about 2 minutes. On the other hand, this concentration can be reduced to 2 percent sulfur trioxide, if desired, with an increase of the contact time to about 8 minutes for the same degree of sulfonation. Other changes in the temperature, etc. can be made by those skilled in the art.

It is further understood that lower degree of sulfonation is generally employed with very thin polymer substrates than with thicker one. For example, it is found that a film having a thickness of 1 mil is completely sulfonated throughout at a degree of sulfonation of about 1 milligram sulfur trioxide equivalent per square centimeter.

Although not required, it is generally preferable to neutralize the sulfonic acid groups on the surface of the plastic article by contacting the article with gaseous ammonia or dilute aqueous solutions of basic materials of inorganic compounds. Examples of these are gaseous and aqueous ammonia, aqueous solutions of alkali metal and alkali metal and alkaline earth metal hydroxides, carbonates, bicarbonates, and the like such as sodium hydroxide, potassium hydroxide, calcium hydroxide, magnesium carbonate, sodium bicarbonate, etc. The sulfonic acid groups may also be neutralized with organic amines such as the alkyl amines wherein alkyl has from one to 15 carbon atoms such as ethyl amine, trimethyl amine and the like, the mono-, di- and tri-alkanol amines wherein alkanol has from two to 10 carbon atoms, the polyamines such as polyethyeneimine and other amines set forth in U.S. Pat. No. 2,832,698.

Following sulfonation or sulfonation and neutralization, the plastic articles are advantageously water washed and dried to remove excess sulfonating or neutralization agents.

The shaped articles having the specified amount of sulfonic acid groups or neutralized sulfonic acid groups per square centimeter of surface are found to have a surface resistivity of less than $10^9$ ohm per square.

Dielectric materials employed in the practice of this invention are advantageously non-conductive, normally solid, organic polymers as enumerated hereinbefore and those conventionally employed as dielectric materials in production of electrical capacitors. Preferred dielectric materials are the vinyl chloride/vinylidene chloride copolymer, vinyl chloride/acrylonitrile copolymers, the polyesters such as poly(ethylene terephthalate) and poly(ethylene 1,5-naphthalate); poly(p-xylene); poly(chloro-p-xylene); poly(dichloro-p-xylene); chloro-p-xylene/dichloro-p-xylene copolymer. Also included among the suitable dielectric materials are polymers of tetrafluoroethylene, chlorotrifluoroethylene, and the like.

In the capacitors of the present invention, the dielectric material has an average thickness in the range from about 0.1 to about 50 mils, preferably from about 0.3 to about 10 mils.

The capacitors of the present invention can be suitably prepared by laminating two or more electroconductive layers to one or more layers of dielectric material in an alternating manner or by assembling said layers in an alternating manner such that the electroconductive layers are electrically insulated from one another by a layer of dielectric material. Any conventional technique for laminating organic plastic materials such as applying sufficient heat and pressure to plastify one or more of the plastics is suitable, provided however that physical integrity of the alternating layers is not disrupted to the point of permitting contact between two or more electroconductive layers. In order to assure such disruption will not occur, it is desirable to carry out lamination at temperatures which are not in excess of the heat distortion point of the dielectric polymer materials, preferably at temperatures lower than such point. Lamination may also be carried out by employing glue layers between the layers of electroconductive material and dielectric material. Other lamination techniques which are commonly employed in the plastic art are also suitable in the practice of this invention. Assembling of said layers is suitably done by stacking or otherwise arranging the layers in the prescribed configuration.

In a particularly desirable embodiment, the all-plastic capacitor is produced by surface treating, e.g., surface sulfonating, the opposing sides of a non-conductive plastic sheet, film or otherwise shaped article in such a manner as to render said surfaces electroconductive, but to not alter the dielectric properties of the polymer centrally located in the plastic article. As a result, the opposing electroconductive surfaces of the plastic article are the electrodes and the non-conductive centrally located polymer is the dielectric which insulates the electrodes from each other. As a further modification, the plastic article can be treated on only one surface so as to make it electroconductive to form a wound capacitor in a manner similar to that described in U.S. Pat. No. 3,397,085.

The foregoing description of preparation of all-plastic capacitors is meant to disclose preferred methods of making such capacitors. It is understood, however, that the present invention is not limited to capacitors made in any particular manner. The present invention is inclusive of any all-plastic capacitor having an electroductive plastic material as electrodes and a non-conductive plastic material as the dielectric material.

The following examples are given to further illustrate the invention and should not be construed as limiting its scope.

EXAMPLE 1

Figure 3:
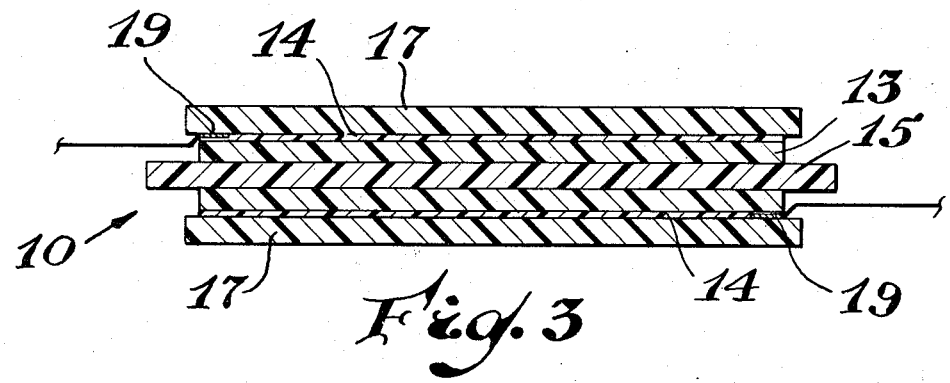
FIG. 3 is a cross-sectional view of an all-plastic capacitor assembly.

A two-plate all-plastic transparent capacitor 10 is depicted in FIG. 3 is made by first surface sulfonating one side each of two sheets (8½ inches × 11 inches × 3.5 mil) of high impact polystyrene containing 6.5 weight percent of diene rubber (4 parts polybutadiene and 2.5 parts styrene/butadiene copolymer) by exposing sheets to 2 volume percent of sulfur trioxide in carbon dioxide in a dry atmosphere for 1 minute at 25°C to provide 0.004 milligram of sulfur trioxide equivalent per square centimeter of surface. The sulfonic acids groups of the polystyrene sheets are neutralized by immersing the sheets in an aqueous solution of 2 weight percent ammonia and then rinsing the sheets in distilled water. The sheets 13 are placed on either side of a sheet 15 (10½ inches × 13 inches × 1 mil) of vinyl chloride/vinylidene chloride (15/85) copolymer such that the copolymer sheet is the dielectric material which electrically insulates the sulfonated polystyrene sheets from one another. The sulfonated surfaces 14 of sheets 13 are the outermost of the capacitor and the copolymer sheet 15 extends outwardly 1 inch from the edges of the sheets 13. Two (1 × 2 × 0.001) tabs 19 of aluminum are attached one to each of sheets 13 at opposite corners thereof. The capacitor 10 is then covered with a top layer 17 and a bottom layer 17 of vinylchloride/vinylidene chloride (15/85) sheet (13 inches × 13 inches × 1 mil). The capacitor is then measured for electrical properties and the results are recorded in Table I.

For comparison purposes, a second capacitor ($C_1$) is assembled in accordance with the preceding method except that the polystyrene sheets are not surface sulfonated and neutralized. Also a third capacitor ($C_2$) is assembled by placing two sheets (8½ × 11  0.0008 inches) of aluminum foil on either side (10½ × 13 × 0.0001 inches) a sheet of the same vinyl chloride/vinylidene chloride copolymer such that the copolymer sheet forms a dielectric layer between the sheets of foil. The electrical properties of these capacitors are also determined and recorded in Table I.

TABLE I

| Sample No. | Applied pressure (1), psig | Measured Capacitance (2) pico Farad |
|---|---|---|
| 1 | 0.02 | 3 |
|   | 0.05 | 5 |
| $C_1$* | 0.02 | 0.1 |
|   | 0.05 | 0.1 |
| $C_2$* | 0.02 | 3 |
|   | 0.05 | 5 |

* Not an example of the invention
(1) Pressure in pounds per square inch applied to the sides of the capacitor.
(2) Measured as pico Farad using an Electrometer (Solid State Keithly, Model 602). A complete description of measurement method is given in Instruction Manual Model 602 Solid State Electrometer by Keithly Instruments Incorporated, 1968.

EXAMPLE 2

A 96-plate all-plastic translucent capacitor is assembled by stacking in alternative fashion 96 surface sulfonated sheets (8½ inches × 11 inches × 3.5 mil) of polystyrene as described in Example 1 and 95 sheets (11 inches × 13½ inches × 0.5 mil) of vinyl chloride/vinylidene chloride (15/85) copolymer such that the 96 surface sulfonated sheets are electrically insulated from one another by the vinyl chloride/vinylidene chloride copolymer sheets, each of such copolymer sheets extends 1¼ inches beyond the edges of the adjacent surface sulfonated sheets. The stacking of surface sulfonated sheets with respect to each other is such that 8½ inches × 8½ inches of the sheets overlap with the remaining 2½ inches of each sheet not overlapped alternatively extending outward at opposite ends. To make terminal connection to the sulfonated sheets at one end of the 96-plate capacitor, a strip (97 inches × 1 inches × 1.5 mil) of steel film is folded back and forth at ½-inch intervals and inserted between the sheets such that each one of the surface sulfonated sheets contact a fold of the steel strip. In a similar manner, a terminal is provided at the opposite end of the 96-plate capacitor. Capacitance of the 96-plate all-plastic capacitor is determined by the method described in Example 1 to be 11.4 micro Farad.

For purposes of comparison, capacitance of a similarly constructed 96-plate capacitor except having aluminum foil sheets (8½ inches × 11 inches × 0.8 mil) as electrodes is determined by the same method to be 5.4 micro Farads.

EXAMPLE 3

Results similar to those obtained in Example 2 are observed for 96-plate all-plastic capacitor in which the surface sulfonated polystyrene sheets are not neutralized with ammonia. The steel terminals, however, are corroded more in this example than in Example 2.

What is claimed is:

1. An all-plastic capacitor comprising two electrodes, each of said electrodes being a layer of an electroconductive organic plastic, and a layer of a dielectric material of a non-conductive organic plastic which extends beyond the edges of the electrodes and electrically separates the electrodes.

2. A transparent thin film capacitor according to claim 1 comprising a first electrode of a layer of an electroconductive organic plastic, a layer of dielectric material coating a surface of said first electrode and extending beyond the edges of said first electrode, and a second electrode of an electroconductive organic plastic coating the other surface of said dielectric layer and electrically insulated from said first electrode by said dielectric layer.

3. A plastic capacitor according to claim 1 wherein each electrode comprises an organic polymer member having from about 0.0001 to about 30 milligrams per square centimeter of sulfur trioxide equivalents on the surface thereof.

4. A plastic capacitor according to claim 3 wherein each electrode comprises an organic polymer member having a surface thereof from about 0.001 to about 1 milligram of sulfur trioxide equivalent per square centimeter.

5. A plastic capacitor according to claim 1 wherein each electrode comprises an organic polymer member having from about 0.0001 to about 30 milligrams per square centimeter of neutralized sulfonic acid equivalents calculated as sulfur trioxide on a surface thereof.

6. A plastic capacitor comprising two electrodes having attached thereto electrical leads, each of said electrode being an electroconductive organic plastic exclusive of electroconductive particles, and a layer of dielectric material of a non-conductive organic plastic which electrically separates the electrodes.

7. A plastic capacitor comprising two electrodes, each of said electrodes being an electroconductive organic plastic exclusive of electroconductive particles, and a layer of dielectric material of a non-conductive organic plastic which extends beyond the edges of the electrodes and electrically separates the electrodes.

* * * * *